United States Patent
Zhuang

(10) Patent No.: US 9,644,951 B2
(45) Date of Patent: May 9, 2017

(54) POINTER-TYPE ANGLE MEASURING DEVICE WITH WIRELESS POWER SUPPLY FOR LIGHTING

(71) Applicant: ZHEJIANG RONGSHENG TOOL CO., LTD, Jinhua, Zhejiang (CN)

(72) Inventor: Chengrong Zhuang, Jinhua (CN)

(73) Assignee: ZHEJIANG RONGSHENG TOOL CO., LTD, Jinhua (CN)

( * ) Notice: Subject to any disclaimer, the term of this patent is extended or adjusted under 35 U.S.C. 154(b) by 238 days.

(21) Appl. No.: 14/556,256

(22) Filed: Dec. 1, 2014

(65) Prior Publication Data

US 2016/0061593 A1   Mar. 3, 2016

(30) Foreign Application Priority Data

Aug. 29, 2014   (CN) .......................... 2014 1 0432033

(51) Int. Cl.
| | |
|---|---|
| *G01B 11/26* | (2006.01) |
| *G01B 21/22* | (2006.01) |
| *G01B 7/30* | (2006.01) |
| *G01C 9/18* | (2006.01) |
| G01C 7/00 | (2006.01) |
| G01C 1/00 | (2006.01) |
| G01B 5/24 | (2006.01) |

(52) U.S. Cl.
CPC ............... *G01B 11/26* (2013.01); *G01B 7/30* (2013.01); *G01B 21/22* (2013.01); *G01C 9/18* (2013.01); *G01B 5/24* (2013.01); *G01C 1/00* (2013.01); *G01C 7/00* (2013.01)

(58) Field of Classification Search
CPC ........ G01B 11/26; G01B 21/22; G01B 13/18; G01B 7/30; G01B 5/24; G01C 9/18; G01C 1/00; G01C 17/00

USPC .......................................................... 356/138
See application file for complete search history.

(56) References Cited

U.S. PATENT DOCUMENTS

| | | | | | |
|---|---|---|---|---|---|
| 3,572,925 | A | * | 3/1971 | Ables ..................... | G03B 27/44 355/46 |
| 4,899,453 | A | * | 2/1990 | Bhat ...................... | G01C 17/04 33/272 |
| 5,270,545 | A | * | 12/1993 | Phillips .................. | G01C 17/22 250/330 |

(Continued)

FOREIGN PATENT DOCUMENTS

| | | |
|---|---|---|
| CN | 2064497 U | 10/1990 |
| CN | 2165467 Y | 5/1994 |
| CN | 2441114 Y | 8/2001 |

OTHER PUBLICATIONS

1st Office Action of counterpart Chinese Patent Application No. 201410432033.3 issued on May 26, 2016.

*Primary Examiner* — Hina F Ayub

(57) ABSTRACT

The invention belongs to the field of measuring tools, particularly relates to a pointer-type angle measuring device with wireless power supply for lighting for measuring angle state of an object. The invention includes a housing, a dial, a pointer and an electronic circuit. Wherein, the electronic circuit includes a wireless power supply circuit and a wireless power receiving and lighting circuit, and the wireless power receiving and lighting circuit is set on the pointer. The invention is characterized in that the pointer can illuminate, and the invention is convenient for people to use in a low light environment, to measure angle of the object.

13 Claims, 3 Drawing Sheets

(56) References Cited

U.S. PATENT DOCUMENTS

| | | | | |
|---|---|---|---|---|
| 6,222,625 B1* | 4/2001 | Johnston | ................ | G01B 11/26 |
| | | | | 33/534 |
| 2005/0006961 A1* | 1/2005 | Shen | .................... | A63B 21/222 |
| | | | | 310/50 |
| 2007/0266575 A1* | 11/2007 | Nash | ...................... | A62B 99/00 |
| | | | | 33/355 R |
| 2014/0049212 A1* | 2/2014 | Sawa | ...................... | H01F 38/14 |
| | | | | 320/108 |
| 2015/0249343 A1* | 9/2015 | Makwinski | ............ | H02J 5/005 |
| | | | | 307/104 |

\* cited by examiner

POINTER-TYPE ANGLE MEASURING DEVICE WITH WIRELESS POWER SUPPLY FOR LIGHTING

CROSS-REFERENCE TO RELATED PATENT APPLICATION

The present patent application claims benefit of Chinese patent application No. 201410432033.3 filed on Aug. 29, 2014, the entire contents of which are incorporated by reference.

TECHNICAL FIELD

The invention belongs to the field of measuring tools, particularly relates to a pointer-type angle measuring device with wireless power supply for lighting for measuring and correcting horizontal, vertical, 45 degree and other angle state of an object.

BACKGROUND

It is needed to measure and correct horizontal, vertical and other angle state of an object during operation processes such as house decoration, maintenance, item installation, etc. The pointer in the existing pointer-type angle measuring device has no lighting function, and lead to inconvenient in measuring and correction of horizontal, vertical and other angle states of objects in a low light environment.

SUMMARY

Against the disadvantages in that because the pointer has no lighting function, the existing pointer-type angle measuring device is inconvenient to measure angle in a low light environment, the invention provide a pointer-type angle measuring device with wireless power supply for lighting, and brings convenience for people to measure and correct horizontal, vertical and other angle states of objects in a low light environment.

The technical schemes adopted in the invention are achieved as follows: a pointer-type angle measuring device with wireless power supply for lighting, which includes a housing, a dial, a pointer and an electronic circuit, wherein, the electronic circuit includes a wireless power supply circuit and a wireless power receiving and lighting circuit, and the wireless power receiving and lighting circuit is set on the pointer.

In the pointer-type angle measuring device with wireless power supply for lighting, the housing consists of a front cover and a rear cover, a window is set in the front cover, a transparent cover is set on the window of the front cover, and the pointer is set in an inner cavity of the housing inside of the transparent cover.

In the pointer-type angle measuring device with wireless power supply for lighting, the pointer consists of a pointer body and a pointer head, the pointer body is a housing structure with an inner cavity, the pointer head of the pointer is made of a transparent material.

In the pointer-type angle measuring device with wireless power supply for lighting, the wireless power supply circuit includes a power transmitter coil and a circuit board of the wireless power supply circuit, a power transmitter coil fixing base is set on the inner side of the rear cover, the power transmitter coil is fixed on power transmitter coil fixing base, and the power transmitter coil is connected with the circuit board in the wireless power supply circuit through a wire.

In the pointer-type angle measuring device with wireless power supply for lighting, the wireless power receiving and lighting circuit includes a power receiver coil, a second light emitting diode for lighting of the pointer head and a circuit board in the wireless power receiving and lighting circuit, a power receiver coil fixing base is set on the back of the pointer body, and the power receiver coil is fixed on the power receiver coil fixing base.

In the pointer-type angle measuring device with wireless power supply for lighting, a shaft hole is set in the middle of the power receiver coil fixing base for communicating with the pointer body, a bearing is mounted in the shaft hole in the middle of the pointer body and the power receiver coil fixing base, a main shaft is mounted in a bearing hole of the bearing, one end of the main shaft is fixed on the transparent cover, the other end of the main shaft is fixed on the rear cover, and the pointer can rotate around the main shaft as the axis.

In the pointer-type angle measuring device with wireless power supply for lighting, a level bubble is set in the inner cavity of the pointer body, a level bubble window is set in the front surface of the pointer body of the pointer, and the level bubble window is located above the circuit board in the wireless power receiving and lighting circuit.

In the pointer-type angle measuring device with wireless power supply for lighting, the dial is circular, the dial is set on the outer edge of the window in the front cover in the inner cavity of the housing inside of the transparent cover, a circular light emitting diode fixing ring is set on the back of the dial, and a first light emitting diode is set on the light emitting diode fixing ring.

In the pointer-type angle measuring device with wireless power supply for lighting, the wireless power supply circuit includes a microcomputer processor $IC_1$, a wireless transmitting circuit, an LED driving circuit, an energy-saving circuit and a power circuit.

In the pointer-type angle measuring device with wireless power supply for lighting, the microcomputer processor $IC_1$ is HT48R063B microcomputer processor.

In the pointer-type angle measuring device with wireless power supply for lighting, the wireless transmitting circuit includes a triode Q, a transmitter coil $L_1$, a capacitor 5 $C_5$, a resistor 2 $R_2$ and a resistor 3 $R_3$, wherein one end of the resistor 2 $R_2$ is connected with the pin 2 of the microcomputer processor $IC_1$, the other end of the resistor 2 $R_2$ is connected with a base electrode of the triode Q, the collector electrode of the triode Q is serially connected with the transmitter coil $L_1$ and the capacitor 5 $C_5$ in turn, the other end of the capacitor 5 $C_5$ is grounded, a node between the transmitter coil $L_1$ and the capacitor 5 $C_5$ is connected to the power supply voltage VCC of the circuit, an emitter electrode of the triode Q is connected with one end of the resistor 3 $R_3$, and the other end of the resistor 3 $R_3$ is grounded.

In the pointer-type angle measuring device with wireless power supply for lighting, the LED driving circuit includes a resistor 7 $R_7$, a resistor 8 $R_8$, a resistor 9 $R_9$, a resistor 10 $R_{10}$ and a first light emitting diode, wherein, the first light emitting diode consists of a light emitting diode 1 $LED_1$, a light emitting diode 2 $LED_2$, a light emitting diode 3 $LED_3$ and a light emitting diode 4 $LED_4$, all anodes of the light emitting diode 1 $LED_1$, the light emitting diode 2 $LED_2$, the light emitting diode 3 $LED_3$ and the light emitting diode 4 $LED_4$ are connected to the power supply voltage VDD of the circuit, cathodes of the light emitting diode 1 $LED_1$, the light emitting diode 2 $LED_2$, the light emitting diode 3 $LED_3$ and the light emitting diode 4 $LED_4$ are respectively connected with one end of the resistor 7 $R_7$, the resistor 8 $R_8$, the resistor 9 $R_9$ and the resistor 10 $R_{10}$, and the other end of the resistor 7 $R_7$, the resistor 8 $R_8$, the resistor 9 $R_9$ and the resistor 10 $R_{10}$ are respectively connected with pin 4, pin 3, pin 1 and pin 16 of the microcomputer processor $IC_1$.

In the pointer-type angle measuring device with wireless power supply for lighting, the energy-saving circuit includes a capacitor 1 $C_1$, a capacitor 4 $C_4$, a resistor 1 $R_1$, a resistor 11 $R_{11}$ and a start switch SK, wherein, the capacitor 1 $C_1$ is an electrolytic capacitor, the anode of the capacitor 1 $C_1$ is connected with one end of the resistor 11 $R_{11}$ and the power supply voltage VCC of the circuit, the cathode of the capacitor 1 $C_1$ is grounded and connected with one end of the resistor 11 $R_{11}$, one end of the capacitor 4 $C_4$ and one end of the resistor 1 $R_1$, the other end of the capacitor 4 $C_4$ is connected with one end of the start switch SK and the pin 7 of the microcomputer processor $IC_1$, the other end of the start switch SK is connected with the other end of the resistor 1 $R_1$;

The power circuit includes a parallel voltage-stabilizing integrated circuit $IC_2$, a capacitor 2 $C_2$, a capacitor 3 $C_3$, a resistor 4 $R_4$, a resistor 5 $R_5$, a resistor 6 $R_6$ and a resistor 12 $R_{12}$, wherein, the capacitor 2 $C_2$ is an electrolytic capacitor, the cathode of the capacitor 2 $C_2$ is grounded and connected with the pin 5 of the microcomputer processor $IC_1$, one end of the capacitor 3 $C_3$, the anode of the parallel voltage-stabilizing integrated circuit $IC_2$, one end of the resistor 5 $R_5$ and one end of the resistor 6 $R_6$, the power supply voltage VDD in the circuit is connected to the anode of the capacitor 2 $C_2$, the pin 13 of the microcomputer processor $IC_1$, the pin 12 of the microcomputer processor $IC_1$, the other end of the capacitor 3 $C_3$, the cathode of the parallel voltage-stabilizing integrated circuit $IC_2$, one end of the resistor 4 $R_4$, one end of the resistor 6 $R_6$ and one end of the resistor 12 $R_{12}$, the other end of the resistor 4 $R_4$ is connected with the other end of the resistor 5 $R_5$ and a reference electrode of the parallel voltage-stabilizing integrated circuit $IC_2$, and the other end of the resistor 12 $R_{12}$ is connected to the power supply VCC in the circuit.

In the pointer-type angle measuring device with wireless power supply for lighting, wireless power receiving and lighting circuit includes a power receiver coil $L_2$, a capacitor 6 $C_6$ and a second light emitting diode, wherein, the second light emitting diode consists of a light emitting diode 5 $LED_5$ and a light emitting diode 6 $LED_6$, the cathode of the light emitting diode 5 $LED_5$ is connected with the anode of the light emitting diode 6 $LED_6$, the anode of the light emitting diode 5 $LED_5$ is connected with one end of the power receiver coil $L_2$ and one end of the capacitor 6 $C_6$, the cathode of the light emitting diode 6 $LED_6$ is connected with the other end of the power receiver coil $L_2$ and the other end of the capacitor 6 $C_6$.

Operating principles of the pointer-type angle measuring device with wireless power supply for lighting of the invention are as follows: the first light emitting diode consisting of the light emitting diode 1 $LED_1$, the light emitting diode 2 $LED_2$, the light emitting diode 3 $LED_3$ and the light emitting diode 4 $LED_4$ is connected to the LED driving circuit in the wireless power supply circuit through a lead, for lighting the dial. The wireless transmitting circuit in the wireless power supply circuit, microcomputer processor $IC_1$, etc. generate transmission signals and transmits the signals to the power receiver coil $L_2$ through the power transmitter coil $L_1$, to allow the power transmitter coil $L_1$ to transmit power outwards, the power receiver coil $L_2$ is responsible for non-contact receiving the power transmitted by the power transmitter coil $L_1$ and lighting the second light emitting diode on the circuit board in the wireless power receiving and lighting circuit, and the second light emitting diode irradiates the pointer head of the pointer, thus achieving lighting without power lead connection. No matter what angle the datum level of the pointer-type angle measuring device with wireless power supply for lighting is tilted to, the pointer can always point to the position right above by gravity action of itself. Because the dial is fixed on the transparent cover and rotates with the rotation of the pointer-type angle measuring device with wireless lighting, when the rotation angle of the pointer-type angle measuring device with wireless lighting is determined, the angle in the dial that the pointed points to is the angle that the pointer-type angle measuring device with wireless lighting is tilted to.

Compared to the existing angle measuring device, the pointer-type angle measuring device with wireless power supply for lighting of the invention has characteristics in that the pointer can illuminate, and the pointer-type angle measuring device with wireless power supply for lighting of the invention can be used alone or in combination with a traditional measuring device such as spirit level. It is convenient for people to use the pointer-type angle measuring device with wireless power supply for lighting of the invention to measure and correct horizontal, vertical and other angle state of an object in a low light environment.

BRIEF DESCRIPTION OF THE DRAWINGS

In FIG. 1-FIG. 5, wherein:

Figure 1:
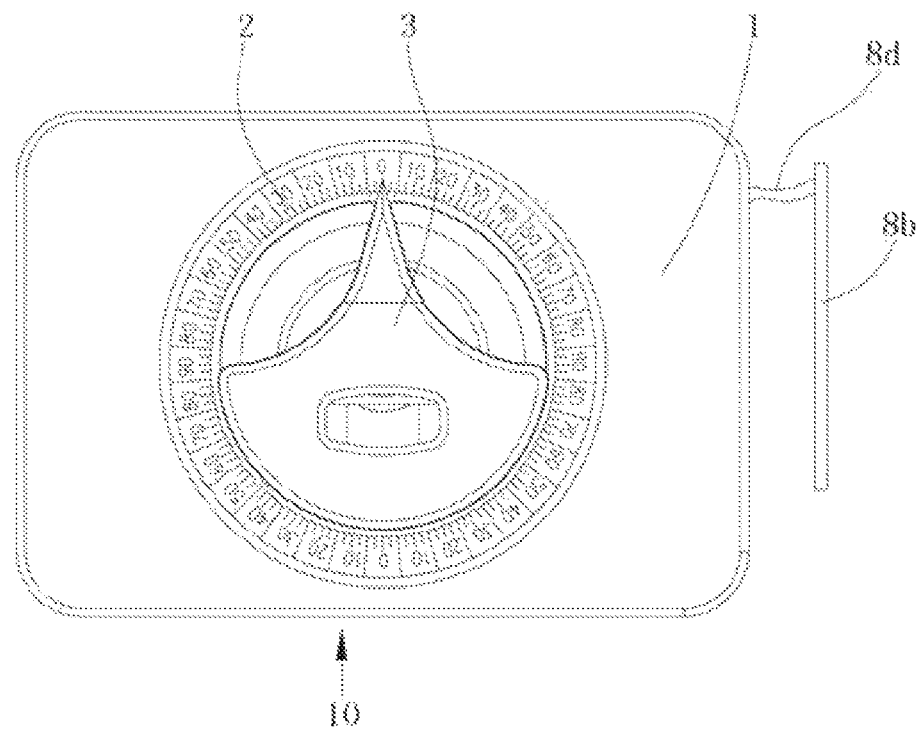
FIG. 1 is an appearance representation of the pointer-type angle measuring device with wireless power supply for lighting of the invention.

1: front cover; 2: dial; 3: pointer; 3a: pointer body; 3a1: level bubble window; 3b: pointer head; 3c: level bubble; 3d: bearing; 3e: main shaft; 3f: power receiver coil fixing base; 4: transparent cover; 5: light emitting diode fixing ring; 6: rear cover; 7: power transmitter coil fixing base; 8: wireless power supply circuit; 801: wireless transmitting circuit; 802: LED driving circuit; 803: energy-saving circuit; 804: power circuit; 8a: power transmitter coil; 8b: circuit board in the wireless power supply circuit; 8c: first light emitting diode; 8d: lead; 9: wireless power receiving and lighting circuit; 9a: power receiver coil; 9b: circuit board in the wireless power receiving and lighting circuit; 9c: second light emitting diode; 10: datum level; $IC_1$: microcomputer processor; $IC_2$: parallel voltage-stabilizing integrated circuit; Q: triode; $LED_1$: light emitting diode 1; $LED_2$: light emitting diode 2; $LED_3$: light emitting diode 3; $LED_4$: light emitting diode 4; $LED_5$: light emitting diode 5; $LED_6$: light emitting diode 6; $C_1$: capacitor 1; $C_2$: capacitor 2; $C_3$: capacitor 3; $C_4$: capacitor 4; $C_5$: capacitor 5; $C_6$: capacitor 6; $L_1$: power transmitter coil; $L_2$: power receiver coil; $R_1$: resistor 1; $R_2$: resistor 2; $R_3$: resistor 3; $R_4$: resistor 4; $R_5$: resistor 5; $R_6$: resistor 6; $R_7$: resistor 7; $R_8$: resistor 8; $R_9$: resistor 9; $R_{10}$: resistor 10; $R_{11}$: resistor 11; $R_{12}$: resistor 12; and SK: start switch.

DETAILED DESCRIPTION

By reference to drawings, the invention will be further described by examples below.

Figure 2:
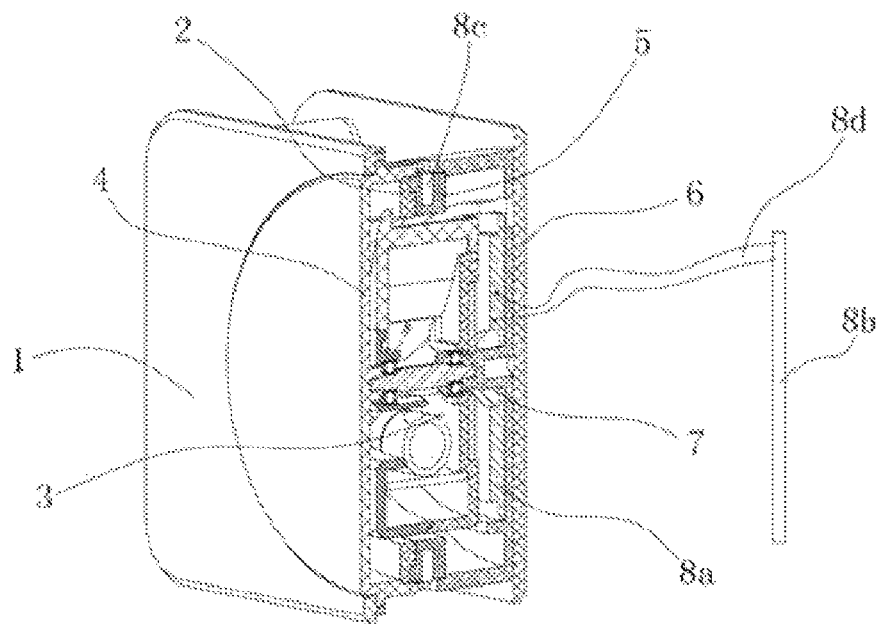
FIG. 2 is a structural representation of the pointer-type angle measuring device with wireless power supply for lighting of the invention.
Figure 3:
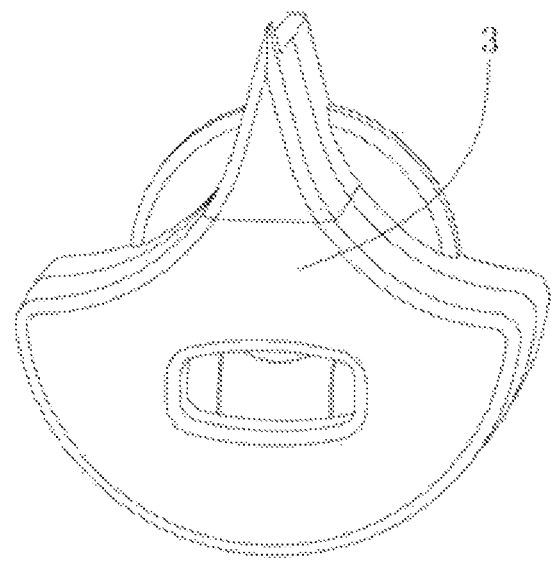
FIG. 3 is an appearance representation of the pointer.
Figure 4:
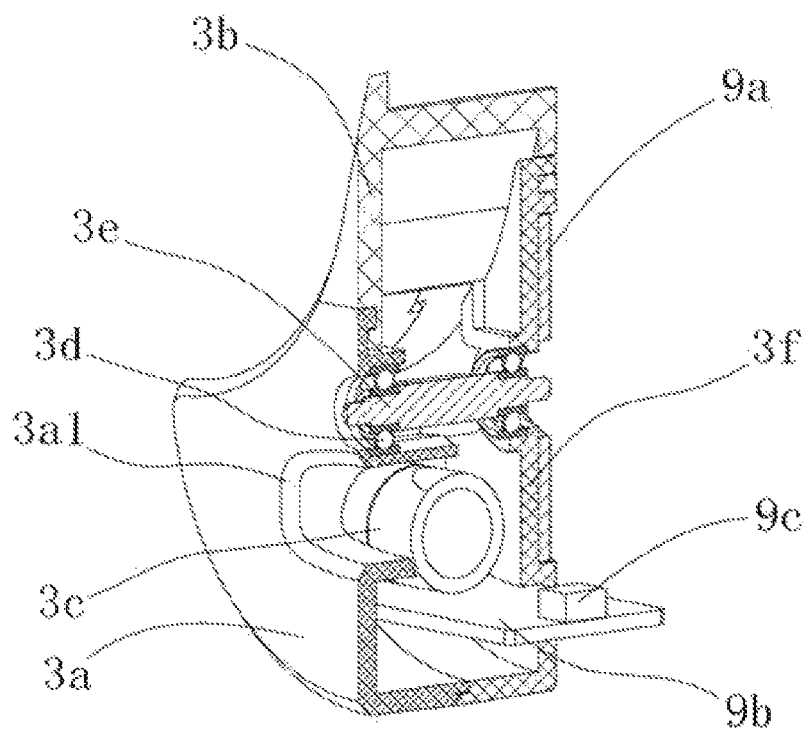
FIG. 4 is a structural representation of the pointer.
Figure 5:
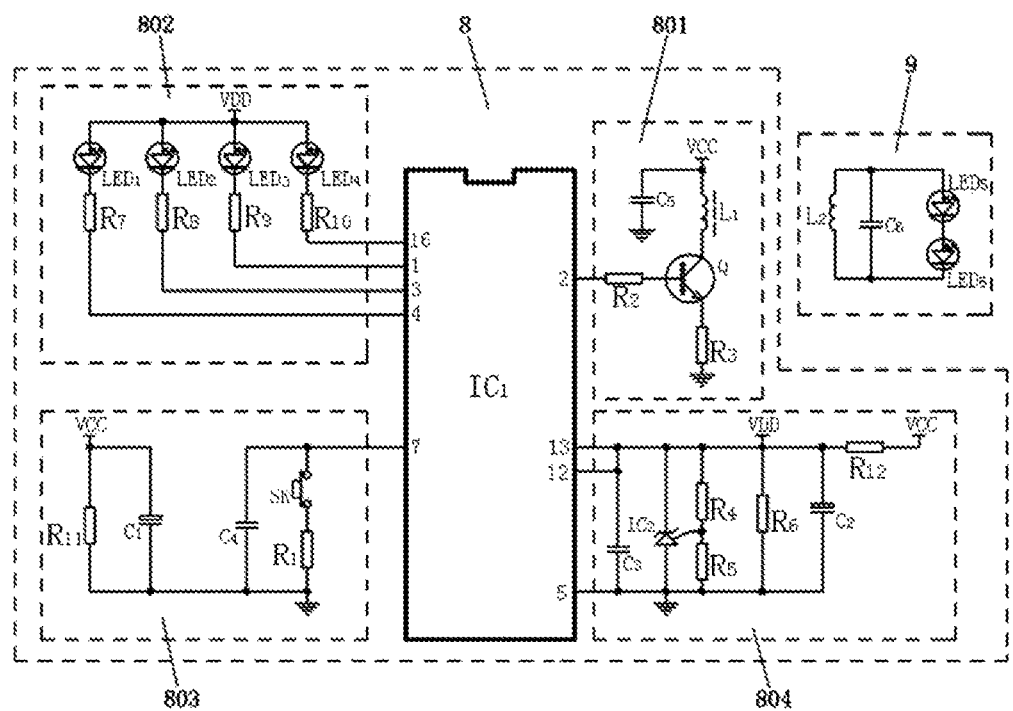
FIG. 5 is a circuit diagram of the electronic circuit of the pointer-type angle measuring device with wireless power supply for lighting of the invention.

Referring to FIG. 1-FIG. 5, a pointer-type angle measuring device with wireless power supply for lighting, includes a housing, a dial 2, a pointer 3 and an electronic circuit. Wherein, the electronic circuit includes a wireless power supply circuit 8 and a wireless power receiving and lighting circuit 9, and the housing consists of a front cover 1 and a rear cover 6. A window is set in the front cover 1, a transparent cover 4 is set on the window of the front cover 1, and the pointer 3 is set in an inner cavity of the housing inside of the transparent cover 4, the pointer 3 consists of a pointer body 3a and a pointer head 3b, and the pointer body 3a is a housing structure with an inner cavity. A level bubble 3c is set in the inner cavity of the pointer body 3a, and a level bubble window 3a1 is set in the front surface of the pointer body 3a of the pointer 3. The pointer head 3b of the pointer 3 is made of a transparent material. The wireless power supply circuit 8 includes a power transmitter coil 8a and a circuit board 8b in the wireless power supply circuit, wherein, a power transmitter coil fixing base 7 is set on the inner side of the rear cover 6, the power transmitter coil 8a is fixed on power transmitter coil fixing base 7, and the power transmitter coil 8a is connected with the circuit board 8b in the wireless power supply circuit through a wire 8d. The wireless power receiving and lighting circuit 9 includes a power receiver coil 9a, a second light emitting diode 9c for lighting of the pointer head 3b and a circuit board 9b in the wireless power receiving and lighting circuit, wherein, a power receiver coil fixing base 3f is set on the back of the pointer body 3a, and the power receiver coil 9a is fixed on the power receiver coil fixing base 3f. A shaft hole is set in the middle of the power receiver coil fixing base 3f for communicating with the pointer body 3a, a bearing 3d is mounted in the shaft hole in the middle of the pointer body 3a and the power receiver coil fixing base 3f, a main shaft 3e is mounted in a bearing hole of the bearing 3d, one end of the main shaft 3e is fixed on the transparent cover 4, the other end of the main shaft 3e is fixed on the rear cover 6, and the pointer 3 can rotate around the main shaft 3e as the axis. The circuit board 9b in the wireless power receiving and lighting circuit is set below the pointer head 3b in the inner cavity of the pointer body 3a and the level bubble window 3a1. The dial 2 is circular, the dial 2 is set on the outer edge of the window in the front cover 1 in the inner cavity of the housing inside of the transparent cover 4, a circular light emitting diode fixing ring 5 is set on the back of the dial 2, and a first light emitting diode 8c is set on the light emitting diode fixing ring 5. The datum level 10 of the pointer-type angle measuring device with wireless power supply for lighting is set on the bottom.

In the pointer-type angle measuring device with wireless power supply for lighting, the wireless power supply circuit 8 consists of a microcomputer processor $IC_1$, a wireless transmitting circuit 801, an LED driving circuit 802, an energy-saving circuit 803 and a power circuit 804, wherein:

The microcomputer processor $IC_1$ is HT48R063B microcomputer processor. Control software of the pointer-type angle measuring device with wireless power supply for lighting of the invention is set in the microcomputer processor $IC_1$ in advance to control the electronic circuit in this invention.

The wireless transmitting circuit 801 includes a triode Q, a transmitter coil $L_1$, a capacitor 5 $C_5$, a resistor 2 $R_2$ and a resistor 3 $R_3$, wherein one end of the resistor 2 $R_2$ is connected with the pin 2 of the microcomputer processor $IC_1$, the other end of the resistor 2 $R_2$ is connected with a base electrode of the triode Q. A collector electrode of the triode Q is serially connected with the transmitter coil $L_1$ and the capacitor 5 $C_5$ in turn, the other end of the capacitor 5 $C_5$ is grounded. A node between the transmitter coil $L_1$ and the capacitor 5 $C_5$ is connected to the power supply voltage VCC of the circuit, an emitter electrode of the triode Q is connected with one end of the resistor 3 $R_3$, and the other end of the resistor 3 $R_3$ is grounded.

The LED driving circuit 802 includes a resistor 7 $R_7$, a resistor 8 $R_8$, a resistor 9 $R_9$, a resistor 10 $R_{10}$ and a first light emitting diode 8c, wherein, the first light emitting diode 8c consists of a light emitting diode 1 $LED_1$, a light emitting diode 2 $LED_2$, a light emitting diode 3 $LED_3$ and a light emitting diode 4 $LED_4$. All anodes of the light emitting diode 1 $LED_1$, the light emitting diode 2 $LED_2$, the light emitting diode 3 $LED_3$ and the light emitting diode 4 $LED_4$ are connected to the power supply voltage VDD of the circuit. Cathodes of the light emitting diode 1 $LED_1$, the light emitting diode 2 $LED_2$, the light emitting diode 3 $LED_3$ and the light emitting diode 4 $LED_4$ are respectively connected with one end of the resistor 7 $R_7$, the resistor 8 $R_8$, the resistor 9 $R_9$ and the resistor 10 $R_{10}$, and the other end of the resistor 7 $R_7$, the resistor 8 $R_8$, the resistor 9 $R_9$ and the resistor 10 $R_{10}$ are respectively connected with pin 4, pin 3, pin 1 and pin 16 of the microcomputer processor $IC_1$.

The energy-saving circuit 803 includes a capacitor 1 $C_1$, a capacitor 4 $C_4$, a resistor 1 $R_1$, a resistor 11 $R_{11}$ and a start switch SK, wherein, the capacitor 1 $C_1$ is an electrolytic capacitor, the anode of the capacitor 1 $C_1$ is connected with one end of the resistor 11 $R_{11}$ and the power supply voltage VCC of the circuit, the cathode of the capacitor 1 $C_1$ is grounded and connected with the other end of the resistor 11 $R_{11}$. One end of the capacitor 4 $C_4$ and one end of the resistor 1 $R_1$, the other end of the capacitor 4 $C_4$ is connected with one end of the start switch SK and the pin 7 of the microcomputer processor $IC_1$, the other end of the start switch SK is connected with the other end of the resistor 1 $R_1$. The energy-saving circuit 803 can cooperate with the microcomputer processor $IC_1$ to achieve energy-saving function; if users forget to turn off the power supply after using the pointer-type angle measuring device with wireless power supply for lighting of the invention, the microcomputer processor $IC_1$ can turn off the power supply for the LED driving circuit 802 and the wireless transmitting circuit 801, thus achieving the goal of energy saving.

The power circuit 804 includes a parallel voltage-stabilizing integrated circuit $IC_2$, a capacitor 2 $C_2$, a capacitor 3 $C_3$, a resistor 4 $R_4$, a resistor 5 $R_5$, a resistor 6 $R_6$ and a resistor 12 $R_{12}$, wherein, the capacitor 2 $C_2$ is an electrolytic capacitor, the cathode of the capacitor 2 $C_2$ is grounded and connected with the pin 5 of the microcomputer processor $IC_1$, one end of the capacitor 3 $C_3$, the anode of the parallel voltage-stabilizing integrated circuit $IC_2$, one end of the resistor 5 $R_5$ and one end of the resistor 6 $R_6$, the anode of the capacitor 2 $C_2$, the pin 13 of the microcomputer processor $IC_1$, the pin 12 of the microcomputer processor $IC_1$, the other end of the capacitor 3 $C_3$, the cathode of the parallel voltage-stabilizing integrated circuit $IC_2$, one end of the resistor 4 $R_4$, one end of the resistor 6 $R_6$ and one end of the resistor 12 $R_{12}$ are connected to the power supply voltage VDD in the circuit, the other end of the resistor 4 $R_4$ is connected with the other end of the resistor 5 $R_5$ and a reference electrode of the parallel voltage-stabilizing integrated circuit $IC_2$, and the other end of the resistor 12 $R_{12}$ is connected to the power supply VCC of the circuit.

In the pointer-type angle measuring device with wireless power supply for lighting, the wireless power receiving and lighting circuit 9 includes a power receiver coil $L_2$, a capacitor 6 $C_6$ and a second light emitting diode 9c, wherein, the second light emitting diode consists of a light emitting diode 5 $LED_5$ and a light emitting diode 6 $LED_6$, the cathode of the light emitting diode 5 $LED_5$ is connected with the anode of the light emitting diode 6 $LED_6$, the anode of the light emitting diode 5 $LED_5$ is connected with one end of the power receiver coil $L_2$ and one end of the capacitor 6 $C_6$, the cathode of the light emitting diode 6 $LED_6$ is connected with the other end of the power receiver coil $L_2$ and the other end of the capacitor 6 $C_6$.

What is claimed is:

1. A pointer-type angle measuring device with wireless power supply for lighting, including a housing, a dial (2), a pointer (3) and an electronic circuit, wherein, the electronic circuit comprises a wireless power supply circuit (8) and a wireless power receiving and lighting circuit (9), and the wireless power receiving and lighting circuit (9) is set in the pointer (3); the pointer (3) consists of a pointer body (3a) and a pointer head (3b), the pointer body (3a) is a housing structure with an inner cavity, the pointer head (3b) of the pointer (3) is made of a transparent material; the wireless power receiving and lighting circuit (9) is set in the pointer body (3a) and comprises a power receiver coil (9a), a second light emitting diode (9c) for lighting of the pointer head (3b) and a circuit board (9b) in the wireless power receiving and lighting circuit, wherein, a power receiver coil fixing base (3f) is set on the back of the pointer body (3a), and the power receiver coil (9a) is fixed on the power receiver coil fixing base (3f).

2. The pointer-type angle measuring device with wireless power supply for lighting according to claim 1, wherein, the housing consists of a front cover (1) and a rear cover (6), a window is set in the front cover (1), a transparent cover (4) is set on the window of the front cover (1), and the pointer (3) is set in an inner cavity of the housing inside of the transparent cover (4).

3. The pointer-type angle measuring device with wireless power supply for lighting according to claim 2, wherein, the wireless power supply circuit (8) comprises a power transmitter coil (8a) and a circuit board (8b) in the wireless power supply circuit, wherein a power transmitter coil fixing base (7) is set on the inner side of the rear cover (6), the power transmitter coil (8a) is fixed on power transmitter coil fixing base (7), and the power transmitter coil (8a) is connected with the circuit board (8b) in the wireless power supply circuit through a wire (8d).

4. The pointer-type angle measuring device with wireless power supply for lighting according to claim 3, wherein, a shaft hole is set in the middle of the power receiver coil fixing base (30 for communicating with the pointer body (3a), a bearing (3d) is mounted in the shaft hole in the middle of the pointer body (3a) and the power receiver coil fixing base (3f), a main shaft (3e) is mounted in a bearing hole of the bearing (3d), one end of the main shaft (3e) is fixed on the transparent cover (4), the other end of the main shaft (3e) is fixed on the rear cover (6), and the pointer (3) can rotate around the main shaft (3e) as the axis.

5. The pointer-type angle measuring device with wireless power supply for lighting according to claim 4, wherein, a level bubble (3c) is set in the inner cavity of the pointer body (3a), a level bubble window (3a1) is set in the front surface of the pointer body (3a) of the pointer (3), and the level bubble window (3a1) is located above the circuit board (9b) in the wireless power receiving and lighting circuit.

6. The pointer-type angle measuring device with wireless power supply for lighting according to claim 5, wherein, the dial (2) is circular, the dial (2) is set on the outer edge of the window in the front cover (1) in the inner cavity of the housing inside of the transparent cover (4), a circular light emitting diode fixing ring (5) is set on the back of the dial (2), and a first light emitting diode (8c) is set on the light emitting diode fixing ring (5).

7. The pointer-type angle measuring device with wireless power supply for lighting according to claim 6, wherein, the wireless power supply circuit (8) comprises a microcomputer processor ($IC_1$) a wireless transmitting circuit (801), an LED driving circuit (802), an energy-saving circuit (903) and a power circuit (804).

8. The pointer-type angle measuring device with wireless power supply for lighting according to claim 7, wherein, the microcomputer processor ($IC_1$) is HT48R063B microcomputer processor.

9. The pointer-type angle measuring device with wireless power supply for lighting according to claim 8, wherein, the wireless transmitting circuit (801) comprises a triode (Q), a transmitter coil ($L_1$), a capacitor 5 ($C_5$), a resistor 2 ($R_2$) and a resistor 3 ($R_3$), wherein one end of the resistor 2 ($R_2$) is connected with a pin 2 of the microcomputer processor ($IC_1$) the other end of the resistor 2 ($R_2$) is connected with a base electrode of the triode (Q), a collector electrode of the triode (Q) is serially connected with the transmitter coil ($L_1$) and the capacitor 5 ($C_5$) in turn, the other end of the capacitor 5 ($C_5$) is grounded, a node between the transmitter coil ($L_1$) and the capacitor 5 ($C_5$) is connected to the power supply voltage VCC of the circuit, an emitter electrode of the triode (Q) is connected with one end of the resistor 3 ($R_3$), and the other end of the resistor 3 ($R_3$) is grounded.

10. The pointer-type angle measuring device with wireless power supply for lighting according to claim 8, wherein, the LED driving circuit (802) comprises a resistor 7 ($R_7$), a resistor 8 ($R_8$), a resistor 9 ($R_9$), a resistor 10 ($R_{10}$) and the first light emitting diode, wherein, the first light emitting diode consists of a light emitting diode 1 ($LED_1$), a light emitting diode 2 ($LED_2$), a light emitting diode 3 ($LED_3$) and a light emitting diode 4 ($LED_4$), all anodes of the light emitting diode 1 ($LED_1$), the light emitting diode 2 ($LED_2$), the light emitting diode 3 ($LED_3$) and the light emitting diode 4 ($LED_4$) are connected to the power supply voltage VDD of the circuit, cathodes of the light emitting diode 1 ($LED_1$), the light emitting diode 2 ($LED_2$), the light emitting diode 3 ($LED_3$) and the light emitting diode 4 ($LED_4$) are respectively connected with one end of the resistor 7 ($R_7$), the resistor 8 ($R_8$), the resistor 9 ($R_9$) and the resistor 10 ($R_{10}$), and the other end of the resistor 7 ($R_7$), the resistor 8 ($R_8$), the resistor 9 ($R_9$) and the resistor 10 ($R_{10}$) are respectively connected with pin 4, pin 3, pin 1 and pin 16 of the microcomputer processor ($IC_1$).

11. The pointer-type angle measuring device with wireless power supply for lighting according to claim 8, wherein, the energy-saving circuit (803) comprises a capacitor 1 ($C_1$), a capacitor 4 ($C_4$), a resistor 1 ($R_1$), a resistor 11 ($R_{11}$) and a start switch (SK), wherein, the capacitor 1 ($C_1$) is an electrolytic capacitor, the anode of the capacitor 1 ($C_1$) is connected with one end of the resistor 11 ($R_{11}$) and the power supply voltage VCC of the circuit, the cathode of the capacitor 1 ($C_1$) is grounded and connected with the other end of the resistor 11 ($R_{11}$), one end of the capacitor 4 ($C_4$) and one end of the resistor 1 ($R_1$), the other end of the capacitor 4 ($C_4$) is connected with one end of the start switch (SK) and the pin 7 of the microcomputer processor ($IC_1$), the other end of the start switch (SK) is connected with the other end of the resistor 1 ($R_1$).

12. The pointer-type angle measuring device with wireless power supply for lighting according to claim 8, wherein, the power circuit (804) comprises a parallel voltage-stabilizing integrated circuit (IC$_2$), a capacitor 2 (C$_2$), a capacitor 3 (C$_3$), a resistor 4 (R$_4$), a resistor 5 (R$_5$), a resistor 6 (R$_6$) and a resistor 12 (R$_{12}$), wherein, the capacitor 2 (C$_2$) is an electrolytic capacitor, the cathode of the capacitor 2 (C$_2$) is grounded and connected with the pin 5 of the microcomputer processor (IC$_1$), one end of the capacitor 3 (C$_3$), the anode of the parallel voltage-stabilizing integrated circuit (IC$_2$), one end of the resistor 5 (R$_5$) and one end of the resistor 6 (R$_6$), the anode of the capacitor 2 (C$_2$), the pin 13 of the microcomputer processor (IC$_1$), the pin 12 of the microcomputer processor (IC$_1$), the other end of the capacitor 3 (C$_3$), the cathode of the parallel voltage-stabilizing integrated circuit (IC$_2$), one end of the resistor 4 (R$_4$, one end of the resistor 6 (R$_6$) and one end of the resistor 12 (R$_{12}$) are connected to the power supply voltage VDD of the circuit, the other end of the resistor 4 (R$_4$) is connected with the other end of the resistor 5 (R$_5$) and a reference electrode of the parallel voltage-stabilizing integrated circuit (IC$_2$), and the other end of the resistor 12 (R$_{12}$) is connected to the power supply VCC of the circuit.

13. The pointer-type angle measuring device with wireless power supply for lighting according to claim 8, wherein, wireless power receiving and lighting circuit (9) comprises a power receiver coil (L$_2$), a capacitor 6 (C$_6$) and the second light emitting diode, wherein, the second light emitting diode consists of a light emitting diode 5 (LED$_5$) and a light emitting diode 6 (LED$_6$), the cathode of the light emitting diode 5 (LED$_5$ is connected with the anode of the light emitting diode 6 (LED$_6$), the anode of the light emitting diode 5 (LED$_5$) is connected with one end of the power receiver coil (L$_2$) and one end of the capacitor 6 (C$_6$), the cathode of the light emitting diode 6 (LED$_6$ is connected with the other end of the power receiver coil (L$_2$) and the other end of the capacitor 6 (C$_6$).

\* \* \* \* \*